(12) United States Patent
Kim et al.

(10) Patent No.: US 8,730,655 B2
(45) Date of Patent: May 20, 2014

(54) SIDE KEY CONNECTION DEVICE OF MOBILE TERMINAL

(75) Inventors: Jun Tae Kim, Yongin-si (KR); Min Chul Lee, Boryeong-si (KR); Hee Kyoung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 12/925,990

(22) Filed: Nov. 4, 2010

(65) Prior Publication Data

US 2011/0122586 A1 May 26, 2011

(30) Foreign Application Priority Data

Nov. 20, 2009 (KR) ........................ 10-2009-0112512

(51) Int. Cl.
*H05K 7/00* (2006.01)
*H05K 5/02* (2006.01)
*H02B 1/01* (2006.01)
*H01H 9/00* (2006.01)

(52) U.S. Cl.
USPC ...... 361/679.01; 361/781; 361/814; 361/832; 361/837; 200/238; 200/292

(58) Field of Classification Search
USPC ............ 361/725, 748, 786, 814, 832, 679.01, 361/781, 837; 455/575.3, 575.4, 575.1; 200/238, 292
See application file for complete search history.

(56) References Cited

U.S. PATENT DOCUMENTS

| | | | | |
|---|---|---|---|---|
| 6,148,183 | A * | 11/2000 | Higdon et al. | 455/575.1 |
| 6,489,580 | B2 * | 12/2002 | Yanai et al. | 200/406 |
| 7,164,091 | B2 * | 1/2007 | Lu | 200/292 |
| 2004/0240162 | A1 * | 12/2004 | Hsu et al. | 361/680 |
| 2005/0272491 | A1 * | 12/2005 | Jeon | 455/575.8 |
| 2008/0088489 | A1 * | 4/2008 | Moon | 341/22 |

* cited by examiner

*Primary Examiner* — Timothy Thompson
*Assistant Examiner* — Sherman Ng (57) ABSTRACT

A side key connection device of a mobile terminal simplifies a connection structure between a side key and a main circuit board. The mobile terminal includes a side key and a row and column terminal pad. The mobile terminal also includes a side key connection device installed between the side key and the row and column terminal pad. The side key connection device is electrically connected to the side key and the row and column terminal pad. Thereby, by simplifying a connection structure of a side key, a key cost, an assembly process, and a surface mounting cost can be reduced.

20 Claims, 7 Drawing Sheets

SIDE KEY CONNECTION DEVICE OF MOBILE TERMINAL

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Nov. 20, 2009 and assigned Serial No. 10-2009-0112512, the entire disclosure of which is hereby incorporated by reference.

TECHNICAL FIELD OF THE INVENTION

The present invention relates to a side key connection device of a mobile terminal, and more particularly, to a side key connection device of a mobile terminal that simplifies a side key connection structure.

BACKGROUND OF THE INVENTION

In general, a side key of a mobile terminal is installed in at least one side of a main body of the mobile terminal. The side key is a key for enabling the mobile terminal to send a signal through manipulation and to execute a desired function.

Typically, side keys of mobile terminals can be classified as either a dome switch type or a tact switch type.

The dome switch type side key attaches a dome sheet that includes a dome switch therein to a flexible printed circuit board (FPCB) and solders the FPCB to a connection terminal, i.e. a row and column terminal pad formed in a main circuit board. For the dome switch, a rubber dome switch or a metal dome switch is used.

The tact switch type side key solders and connects a tact switch element to a row and column terminal pad formed in a main circuit board.

Typically, the tact switch uses surface mount devices (SMD) to which surface mount technology (SMT) is applied.

However, when the dome switch is used, an FPCB for attaching a dome sheet is manufactured, and the FPCB is soldered to the main circuit board. In order to fix the FPCB, a fixing support is provided at a side surface of the main circuit board and is fixed by a double-sided tape.

When the tact switch is used, the tact switch is surface mounted to the main circuit board to correspond to the quantity of the side keys.

For such dome switch type side keys, a FPCB is expensive, the dome switch type side key includes many assembly processes, and the main circuit board occupies much space for the FPCB. For tact switch type side keys, a tact switch and surface mounting are expensive, and the main circuit board may increase the thickness of the mobile terminal by a thickness of the tact switch.

SUMMARY OF THE INVENTION

To address the above-discussed deficiencies of the prior art, it is a primary object to provide a side key connection device of a mobile terminal that can simplify a side key structure in order to provide a side key function without using a dome switch or a tact switch.

The present invention further provides a side key connection device of a mobile terminal that can reduce a key cost, an assembly process, and a surface mounting cost.

The present invention further provides a side key connection device of a mobile terminal that can easily reduce a thickness by increasing mounting space.

In accordance with an aspect of the present invention, a mobile terminal includes a side key and a row and column terminal pad. The mobile terminal also includes a side key connection device installed between the side key and the row and column terminal pad and configured to be electrically connected to the side key and the row and column terminal pad.

In certain embodiments, the side key connection device may includes a side row and column terminal pad extended from the row and column terminal pad to a side surface of a main circuit board to be integrally formed. The side key connection device may also include a conductive connection member housed in a housing groove formed in the side key in order to electrically connect the side row and column terminal pad. The side key connection device may further include a pair of elastic members, each having one end coupled to an end of a side surface of the side key opposite to the side surface of the main circuit board and having the other end coupled to the side surface of the main circuit board in order to elastically move the side key.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. Detailed descriptions of well-known functions and structures incorporated herein may be omitted to avoid obscuring the subject matter of the present invention.

Figure 1:
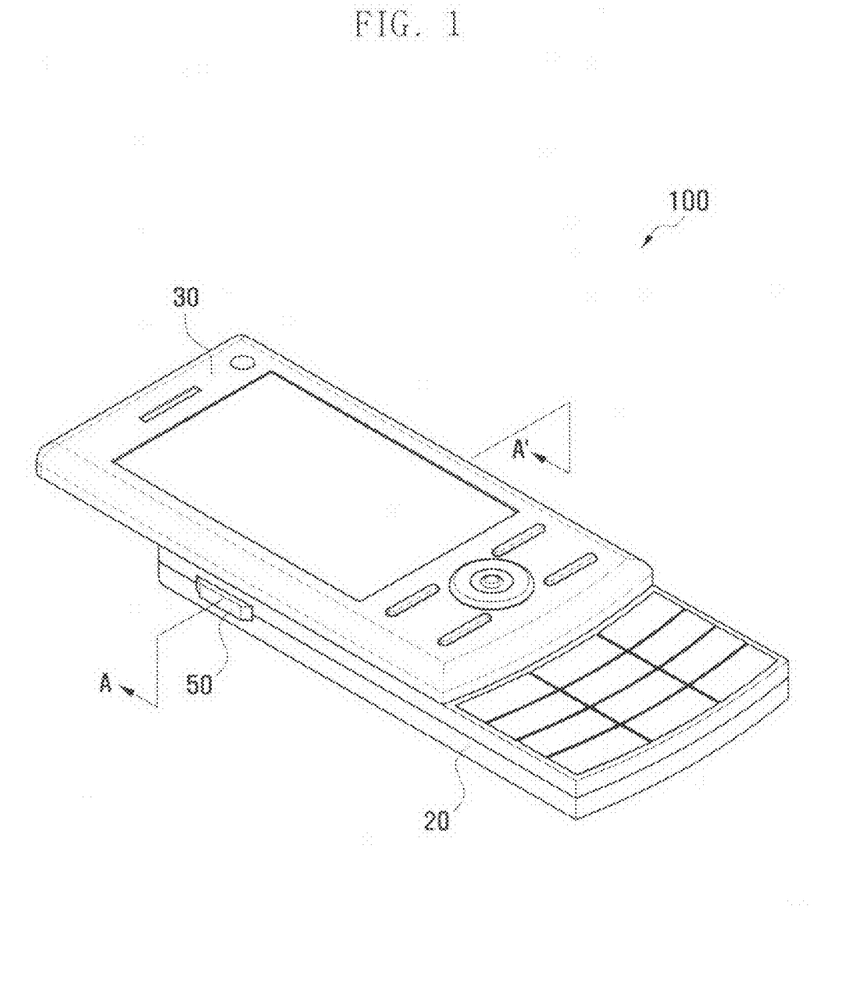
FIG. 1 is a perspective view illustrating a mobile terminal according to an embodiment of the present invention.
Figure 2:
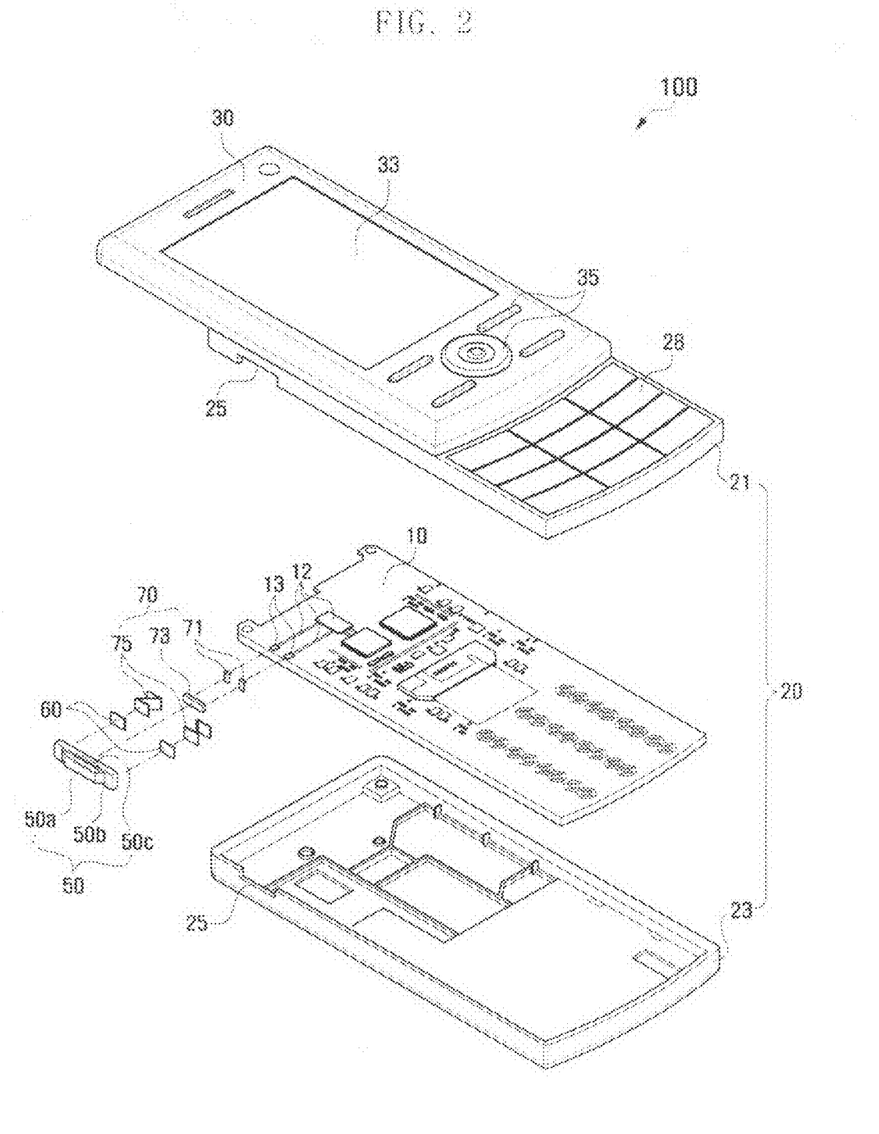
FIG. 2 is an exploded perspective view of the mobile terminal of FIG. 1.
Figure 3:
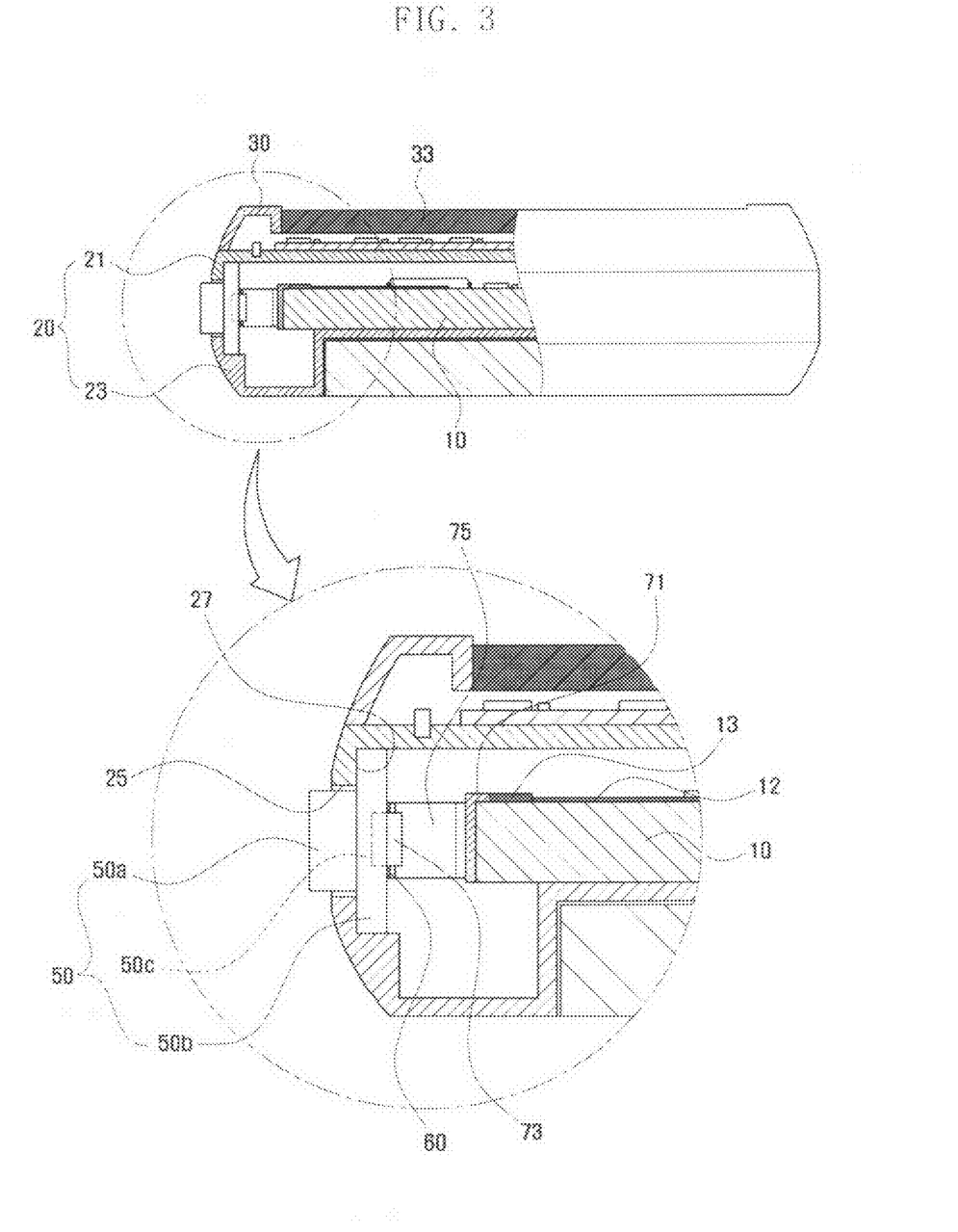
FIG. 3 is a cross-sectional view of the mobile terminal taken along line A-A' of FIG. 1.
Figure 4:
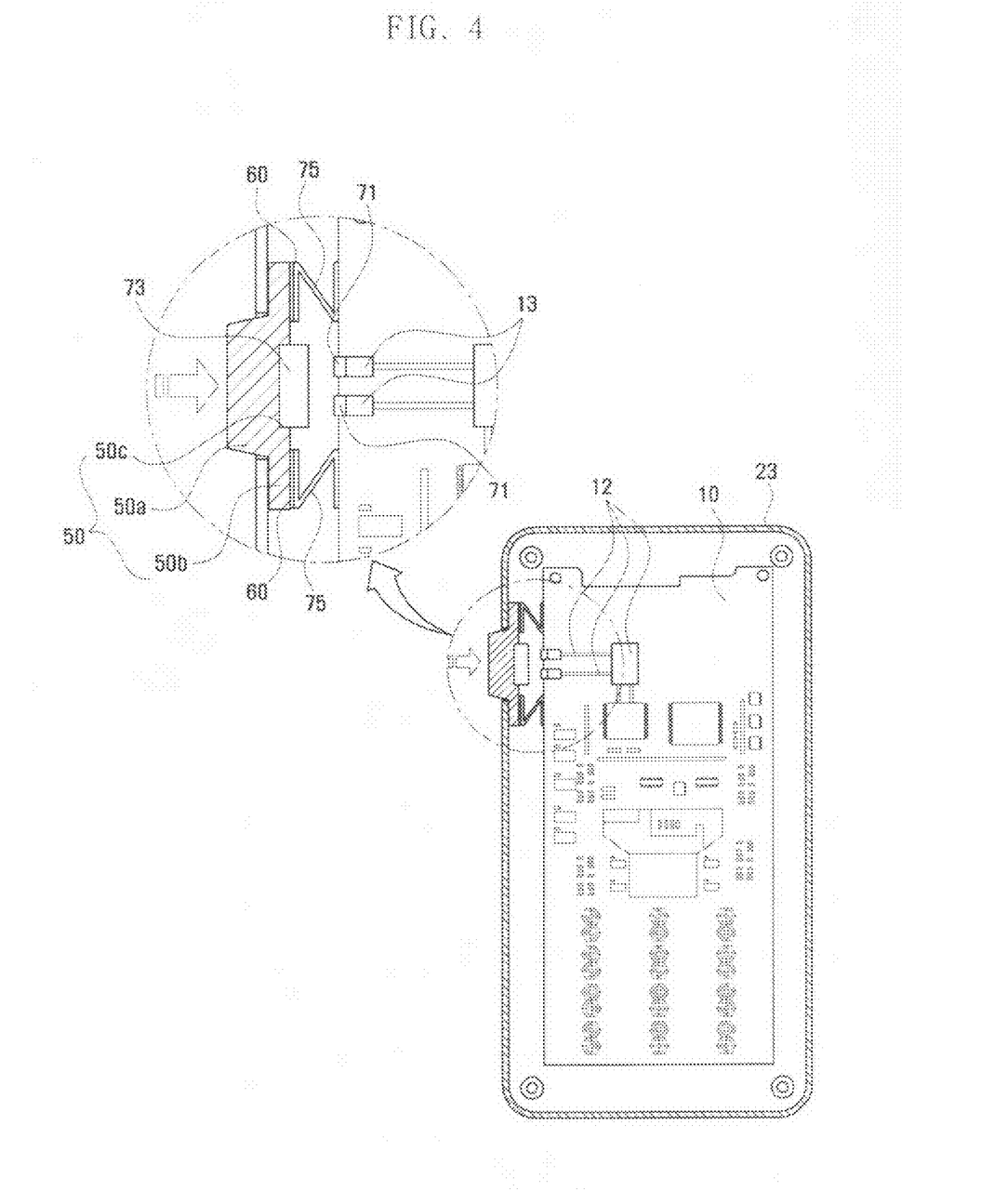
FIG. 4 illustrates a state before operating a side key of the mobile terminal of FIG. 1.
Figure 5:
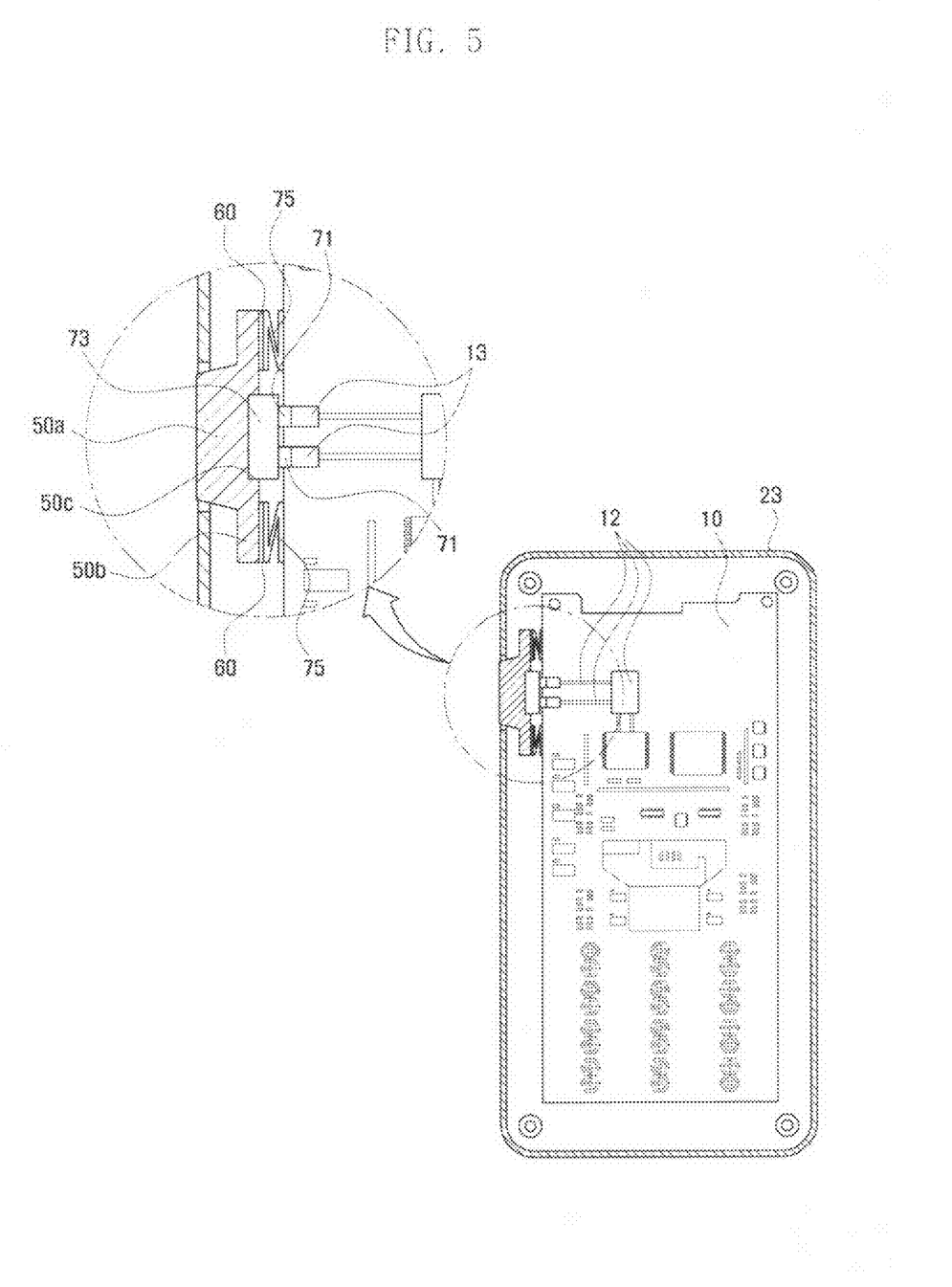
FIG. 5 illustrates a state after operating a side key of the mobile terminal of FIG. 1.

FIG. 1 is a perspective view illustrating a mobile terminal according to an embodiment of the present invention. FIG. 2 is an exploded perspective view of the mobile terminal of FIG. 1. FIG. 3 is a cross-sectional view of the mobile terminal taken along line A-A' of FIG. 1. FIG. 4 illustrates a state before operating a side key of the mobile terminal of FIG. 1. FIG. 5 illustrates a state after operating a side key of the mobile terminal of FIG. 1.

Referring to FIGS. 1-3, a mobile terminal 100 can be formed as a fold type terminal or a slide type terminal. For convenience of description, it is assumed that the mobile terminal 100 is a slide type terminal.

The mobile terminal 100 includes a main circuit board 10, main body 20, slide unit 30, side key 50, and side key connection device 70.

The side key connection device 70 includes a side row and column terminal pad 71, conductive connection member 73, and a pair of elastic members 75.

The side key connection device 70 is installed between the main circuit board 10 and the side key 50. The side key connection device 70, the main circuit board 10, and the side key 50 are installed within the main body 20. The main body 20 is divided into an upper case 21 and a lower case 23.

The side row and column terminal pad 71 is extended from a row and column terminal pad 13 (to be described later) to a side surface of the main circuit board 10. The side row and column terminal pad 71 is integrally formed. That is, the side row and column terminal pad 71 is an electrically connected extension pad and, in certain embodiments, is formed by deposition.

The deposition may include a physical vapor deposition (PVD) or a chemical vapor deposition (CVD). PVD and CVD are well known technology and therefore a detailed description thereof is omitted.

A plurality of row and column terminal pads 13 are formed in at least one of an upper surface and a lower surface of the main circuit board 10. The row and column terminal pads 13 are separated from each other, and are electrically connected to a side key driving circuit 12. Each row and column terminal pad 13 is soldered and coupled to a connection terminal of an existing tact switch (not shown) or side key FPCB (not shown). Therefore, in the present embodiment, an existing complicated side key structure is simplified by the side key connection device 70 connected to the side key 50 (to be described later) using the row and column terminal pad 13.

The side key driving circuit 12 outputs an input signal of the side key 50 to a central processing unit (CPU), and is formed at one side of an upper surface of the main circuit board 10. The side key driving circuit 12 is formed in the main circuit board 10 together with the electrically connected row and column terminal pad 13. The row and column terminal pad 13 includes a key value in a row and column unit. Therefore, when the side key 50 is pressed, a signal input corresponding to a key value is output to the CPU by the side key driving circuit 12.

In the present embodiment, only one row and column terminal pad 13 is formed, however the quantity of row and column terminal pads 13 is not limited thereto. For example, a plurality of row and column terminal pads 13 may be provided on both sides of an upper surface of the main circuit board 10.

The side key 50 includes a side key button 50a that can be manipulated when a user presses the button 50a with a hand, and a blade 50b integrally formed with a circumferential surface of a lower end of the side key button 50a. In the side key 50, a pair of case grooves 25 are formed opposite to side surfaces of the upper case 21 and the lower case 23. Side portions of the side key button 50a are coupled and thus some of a front portion of the side key button 50a is protruded. The blade 50b is fixed by latching to a pair of latch jaws 27 formed behind the side key groove 25 such that the side key 50 is not exposed to the outside.

In the present embodiment, one side key 50 is formed, however the quantity of side keys 50 is not limited thereto. For example, a side key 50 can be installed in both sides of the mobile terminal to correspond to the quantity of the row and column terminal pad 13.

The conductive connection member 73 is formed in a shape that includes a volume and is housed within and fixed to a housing groove 50c formed in a rear surface of the side key 50 opposite to the side row and column terminal pad 71. This arrangement enables the side row and column terminal pad 71 to electrically connect by contacting with the side row and column terminal pad 71. In this case, it is preferable that some of the conductive connection member 73 is housed in the housing groove 50c to make contact with the side row and column terminal pad 71 and the remaining portions of the conductive connection member 73 are exposed. The conductive connection member 73 can be made of a conductive material such as gold, silver, copper, and iron. In the present embodiment, the conductive connection member 73 is inserted into the side key 50. However, in certain embodiments, the conductive connection member 73 may be formed in a plate shape to be bonded with adhesives or be formed using conductive pigment or conductive spray.

Therefore, when the conductive connection member 73 of the side key 50 simultaneously contacts with the side row and column terminal pad 71 by pressing the side key button 50a, the side key driving circuit 12 is electrically connected.

In order to elastically move the side key 50, one end of each of a pair of elastic members 75 is coupled to an end of a rear surface of the blade 50b of the side key 50 opposite a side surface of the main circuit board 10. The other end of each elastic member 75 elastically contacts a side surface of the main circuit board 10. The blade 50b of the side key 50 and the pair of elastic members 75 are coupled and fixed between both ends of a rear surface of the blade 50b of the side key 50 and the ends of the pair of elastic members 75 using a pair of double-sided tapes 60. The other ends of the pair of elastic members 75 opposite to a side surface of the main circuit board 10 elastically contact a side surface of the main circuit board 10. However, the ends of the elastic members 75 may be fixed using a pair of double-sided tapes 60. In the present embodiment, a pair of double-sided tapes 60 are used, however it is not limited to the pair of double-sided tapes 60. For example, the other ends of the pair of elastic members 75 can be fixed using adhesives.

In order to sustain a state where the side key 50 is pressed to the outside, a pair of elastic members 75 contact with a side surface of the main circuit board 10 in a state where the pair of elastic members 75 are compressed to some degree. In an embodiment, each elastic member 75 may be a Z-shaped flat spring or a compression spring. Further, in the present embodiment, the pair of elastic members 75 are flat springs, however they are not limited thereto. For example, coil springs may be used.

In the present embodiment, the side key connection device 70 is applied to the main body 20 in which the main circuit board 10 and the side key 50 are installed. However, the embodiment is not limited thereto. For example, the side key connection device 70 can be applied to the slide unit 30 that includes a display unit 33 therein.

In order to install the side key connection device 70, the side key 50 and the main circuit board 10 can be provided.

A vibration can be operated to notify that the conductive connection member 73 simultaneously contacts with the side row and column terminal pad 71. The vibration can be operated to interlock with a vibration device installed within the mobile terminal 100. That is, the input of a signal of the side key 50 can be notified by a vibration.

Further, a lamp can be operated to notify that the conductive connection member 73 simultaneously contacts with the side row and column terminal pad 71. The lamp can operate to interlock with the side key 50 or a light emitting apparatus of the keypads 28 and 35 positioned at a front portion of the main body 20 and the slide unit 30. That is, the input of a signal of the side key 50 can be notified by turning on a lamp. The lamp may be a light emitted diode (LED).

In addition to the above-described elements, the mobile terminal 100 may include other elements included in a typical mobile terminal such as a battery, touch pad, camera module, and slide hinge module. These are well known elements and therefore a detailed description thereof is omitted.

Next, operation of the side key 50 is described with reference to FIGS. 4 and 5.

Referring to FIG. 4, when an external force is not applied to the side key 50, the conductive connection member 73 and the side row and column terminal pad 71 are separated from each other by the pair of elastic members 75. In this case, a signal input of the side key 50 is interrupted. When a front portion of a side key button 50*a* exposed from the main body 20 is pressed, the pair of elastic members 75 are compressed, and the conductive connection member 73 inserted into a rear surface of the side key 50 simultaneously contacts with the row and column terminal pad 71 of the side surface, as shown in FIG. 5. That is, an input signal of the side key 50 is input to the side key driving circuit 12. In this case, the input of the key signal can be determined by a vibration or a lamp.

When the side key button 50*a* is released, the pair of compressed elastic members 75 are restored, and the side key button 50*a* is returned to an original position, as shown in FIG. 4. Thereby, a contact between the conductive connection member 73 and the row and column terminal pad 71 of the side surface is separated, and an input signal of the side key 50 is interrupted.

Figure 6:
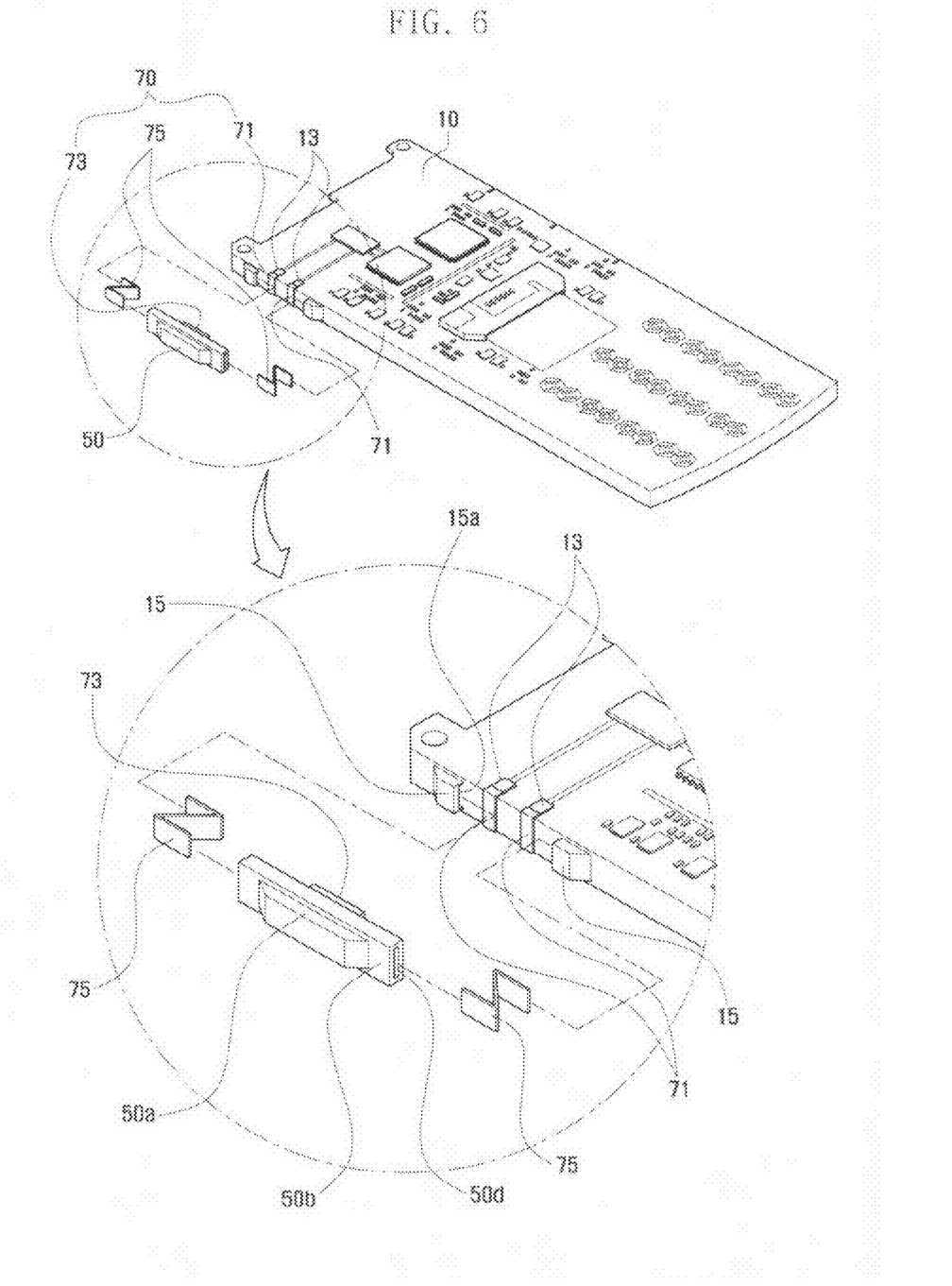
FIG. 6 is a perspective view illustrating a coupling structure of a side key of a mobile terminal according to another embodiment of the present invention.
Figure 7:
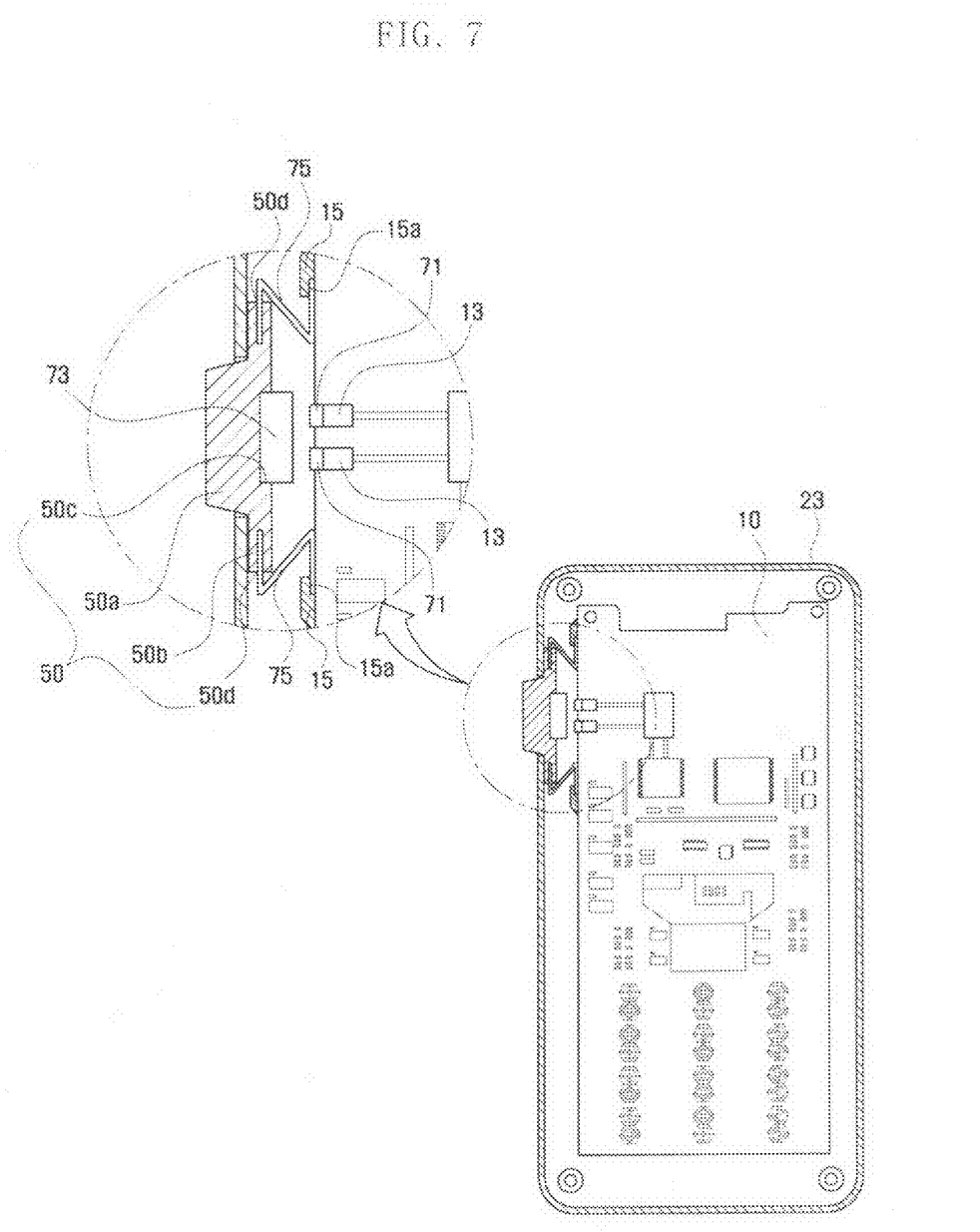
FIG. 7 is a cross-sectional view illustrating a coupling structure of the side key of the mobile terminal of FIG. 6.

FIG. 6 is a perspective view illustrating a coupling structure of a side key of a mobile terminal according to another embodiment of the present invention. FIG. 7 is a cross-sectional view illustrating a coupling structure of the side key of the mobile terminal of FIG. 6.

Referring to FIGS. 6 and 7, in the present embodiment, a side key connection device 70 includes a side row and column terminal pad 71, a conductive connection member 73, and a pair of elastic members 75.

The present embodiment includes the same configuration as that of the previous embodiment, except that a pair of key grooves 50*d* and protrusions 15 are formed in the side key 50 and the main circuit board 10, respectively, of the previous embodiment. Therefore, a detailed description thereof is omitted.

Specifically, in order to rigidly couple the side key 50, the main circuit board 10, and a pair of elastic members 75 together, a pair of key grooves 50*d* that can be coupled to one end of the pair of elastic members 75 are formed at both ends of the side key 50.

In a side surface of the main circuit board 10 opposite to the side key 50, a pair of protrusions 15 are provided that can be coupled to the other end of each of the pair of elastic members 75. The pair of protrusions 15 may be integrally formed with the main circuit board 10 or attached to the main circuit board 10. Insertion grooves 15*a* that can be coupled to the other ends of the pair of elastic members 75 are formed at opposite sides of the pair of protrusions 15.

In this way, by inserting both ends of a pair of elastic members 75 into a pair of key grooves 50*d* of the side key 50 and a pair of insertion grooves 15*a* of the main circuit board 10, respectively, the pair of elastic members 75 can be rigidly and stably fixed.

As described above, according to the present invention, by simplifying a connection structure of a side key, a key cost, an assembly process, and a surface mounting cost can be reduced.

Further, mounting space for other components of a main circuit board can be increased, and an entire thickness of the mobile terminal can be easily reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal, comprising:
   a side key;
   a row and column terminal pad disposed on an upper or lower surface of a main circuit board; and
   a side key connection device disposed between the side key and the row and column terminal pad and configured to be electrically connected to the side key and the row and column terminal pad, the side key connection device comprising:
   a side row and column terminal pad disposed on a side surface of the main circuit board and configured to be electrically connected to the row and column terminal pad;
   a conductive connection member disposed in the side key; and
   an elastic member disposed between the side key and the main circuit board, wherein when the side key is pressed, the elastic member is deformed towards the main circuit board to electrically connect the conductive connection member with the side row and column terminal pad.

2. The mobile terminal of claim 1, wherein when the conductive connection member contacts the side row and column terminal pad, a side key driving circuit is electrically connected.

3. The mobile terminal of claim 1, wherein the side row and column terminal pad is formed by deposition.

4. The mobile terminal of claim 1, wherein the elastic member is a compression spring.

5. The mobile terminal of claim 1, wherein the conductive connection member is vibrated when in contact with the side row and column terminal, pad.

6. The mobile terminal of claim 1, wherein a lamp of the conductive connection member is operated when the conductive connection member is in contact with the side row and column terminal pad.

7. The mobile terminal of claim 6, wherein the lamp comprises a light emitting diode (LED).

8. The mobile terminal of claim 1, wherein an end of the side key comprises at least one key groove, the at least one key groove configured to accept one end of the elastic member.

9. The mobile terminal of claim 1, wherein the side surface of the main circuit board comprises a protrusion, the protrusion comprising an insertion groove configured to accept one end of the elastic member.

10. The mobile terminal of claim 1, wherein the conductive connection member is made of a conductive material selected from a group consisting of gold, silver, copper, and iron.

11. The mobile terminal of claim 2, wherein the conductive connection member is made of a conductive material selected from a group consisting of gold, silver, copper, and iron.

12. The mobile terminal of claim 5, wherein the conductive connection member is made of a conductive material selected from a group consisting of gold, silver, copper, and iron.

13. The mobile terminal of claim 6, wherein the conductive connection member is made of a conductive material selected from a group consisting of gold, silver, copper, and iron.

14. A mobile terminal, comprising:
a main circuit board disposed between an upper case and a lower case;
a side key;
a row and column terminal pad disposed on an upper or lower surface of the main circuit board; and
a side key connection device disposed between the side key and the row and column terminal pad and configured to be electrically connected to the side key and the row and column terminal pad, the side key connection device comprising:
a side row and column terminal pad disposed on a side surface of the main circuit board and configured to be electrically connected to the row and column terminal pad;
a conductive connection member disposed in the side key; and
an elastic member disposed between the side key and the main circuit board, wherein when the side key is pressed, the elastic member is deformed towards the main circuit board to electrically connect the conductive connection member with the side row and column terminal pad.

15. The mobile terminal of claim 14, wherein when the conductive connection member contacts the side row and column terminal pad, a side key driving circuit is electrically connected.

16. The mobile terminal of claim 14, wherein the side row and column terminal pad is formed by deposition.

17. The mobile terminal of claim 14, wherein the elastic member is a compression spring.

18. A mobile terminal, comprising:
a main circuit board;
a side key;
a row and column terminal pad; and
a side key connection device disposed between the side key and the row and column terminal pad and configured to be electrically connected to the side key and the row and column terminal pad, wherein the side key connection device comprises:
a side row and column terminal pad that extends from the row and column terminal pad to a side surface of the main circuit board, wherein the side row and column terminal pad is integrally formed;
a conductive connection member disposed in a groove formed in the side key and configured to electrically connect the side row and column terminal pad; and
a pair of elastic members, each elastic member having a first end coupled to an end of a side surface of the side key and having a second end coupled to a side surface of the main circuit board, the elastic members configured to elastically move the side key.

19. The mobile terminal of claim 18, wherein each end of the side key comprises a key groove, each key groove configured to accept one end of one of the elastic members.

20. The mobile terminal of claim 18, wherein the side surface of the main circuit board comprises a pair of protrusions, each protrusion comprising an insertion groove configured to accept one end of one of the elastic members.

* * * * *